United States Patent
Jurzak et al.

(10) Patent No.: US 10,585,582 B2
(45) Date of Patent: Mar. 10, 2020

(54) SYSTEM AND METHOD FOR DISAMBIGUATING TOUCH INTERACTIONS

(71) Applicant: MOTOROLA SOLUTIONS, INC., Chicago, IL (US)

(72) Inventors: Pawel Jurzak, Cracow (PL); Maciej Kucia, Krzeszowice (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 122 days.

(21) Appl. No.: 15/737,928

(22) PCT Filed: Aug. 21, 2015

(86) PCT No.: PCT/PL2015/050034
§ 371 (c)(1),
(2) Date: Dec. 19, 2017

(87) PCT Pub. No.: WO2017/034425
PCT Pub. Date: Mar. 2, 2017

(65) Prior Publication Data
US 2018/0181297 A1    Jun. 28, 2018

(51) Int. Cl.
*G06F 3/0488* (2013.01)
*G06F 3/048* (2013.01)
*G06F 3/01* (2006.01)
*G06F 3/16* (2006.01)
*G06F 3/041* (2006.01)
*G06F 3/044* (2006.01)

(52) U.S. Cl.
CPC .......... *G06F 3/04883* (2013.01); *G06F 3/016* (2013.01); *G06F 3/167* (2013.01); *G06F 3/044* (2013.01); *G06F 3/0416* (2013.01); *G06F 2203/04104* (2013.01); *G06F 2203/04808* (2013.01)

(58) Field of Classification Search
None
See application file for complete search history.

(56) References Cited

U.S. PATENT DOCUMENTS 6,323,846 B1   11/2001   Westerman et al.
7,030,861 B1   4/2006   Westerman et al.
(Continued)

OTHER PUBLICATIONS

The International Search Report and The Written Opinion, corresponding patent application No. PCT/PL2015/050034, filed Aug. 21, 2015, all pages.

*Primary Examiner* — Nhat Huy T Nguyen

(57) ABSTRACT

A method and apparatus for disambiguating touch interactions is disclosed. Specifically, a plurality of touch events may be received from an input device. The touch events may each occur at a relative time and location with respect to the other touch events. Based at least on the relative locations and relative times of each touch event, a predetermined number of touch events may be grouped into combinations of touch events. For example, touch events may be grouped together into a first and second touch event set based on a largest time difference between consecutive touch events. An action may be determined based at least on the first touch event set. Accordingly, the first touch event set may be disambiguated from other touch interactions and an associated action may be selected from a broader set of possible actions.

20 Claims, 11 Drawing Sheets

(56) References Cited

U.S. PATENT DOCUMENTS

| | | | |
|---|---|---|---|
| 2008/0163131 A1* | 7/2008 | Hirai | G06F 3/0425 |
| | | | 715/863 |
| 2009/0160778 A1* | 6/2009 | Nurmi | G06F 3/04847 |
| | | | 345/173 |
| 2009/0251434 A1* | 10/2009 | Rimon | G06F 1/30 |
| | | | 345/173 |
| 2011/0175831 A1* | 7/2011 | Miyazawa | G06F 3/041 |
| | | | 345/173 |
| 2011/0234503 A1* | 9/2011 | Fitzmaurice | G06F 3/0235 |
| | | | 345/173 |
| 2011/0285648 A1 | 11/2011 | Simon | |
| 2012/0154313 A1 | 6/2012 | Au et al. | |
| 2012/0212437 A1* | 8/2012 | Kobayashi | G06F 1/1624 |
| | | | 345/173 |
| 2015/0378502 A1 | 12/2015 | Hu et al. | |
| 2016/0026850 A1 | 1/2016 | Mrowiec et al. | |
| 2016/0139764 A1* | 5/2016 | Huang | G06F 3/0488 |
| | | | 715/764 |

* cited by examiner

SYSTEM AND METHOD FOR DISAMBIGUATING TOUCH INTERACTIONS

BACKGROUND

Touch-sensitive surfaces are used as input devices in a variety of computing devices, including smartphones, tablets, laptops, two-way radios, smart watches, wearable computing devices, etc. By interacting with the touch-sensitive surface (e.g. touching with one or more fingers), a user may interact with the computing device and/or cause the computing device to carry out a variety of actions.

In some scenarios, it may be inconvenient or impossible for a user to visually confirm that the user's fingers are correctly registered to a given position on the touch-sensitive surface. For example, a user may not have the opportunity or desire to look at the touch-sensitive surface while driving a car, pedaling a bike, running, or conducting another activity. In some situations, a user may be visually impaired or the touch screen may not be lit or labeled. In such situations, it may be useful to provide a robust way to disambiguate touch events on a touch surface without requiring visual confirmation by the user. Fingerprint analysis methods are able to provide some degree of disambiguation between touch events; however, such techniques may fail to work reliably with gloved hands and/or under dirty or other harsh conditions.

Accordingly, there is a need for a system and method for disambiguating touch interactions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
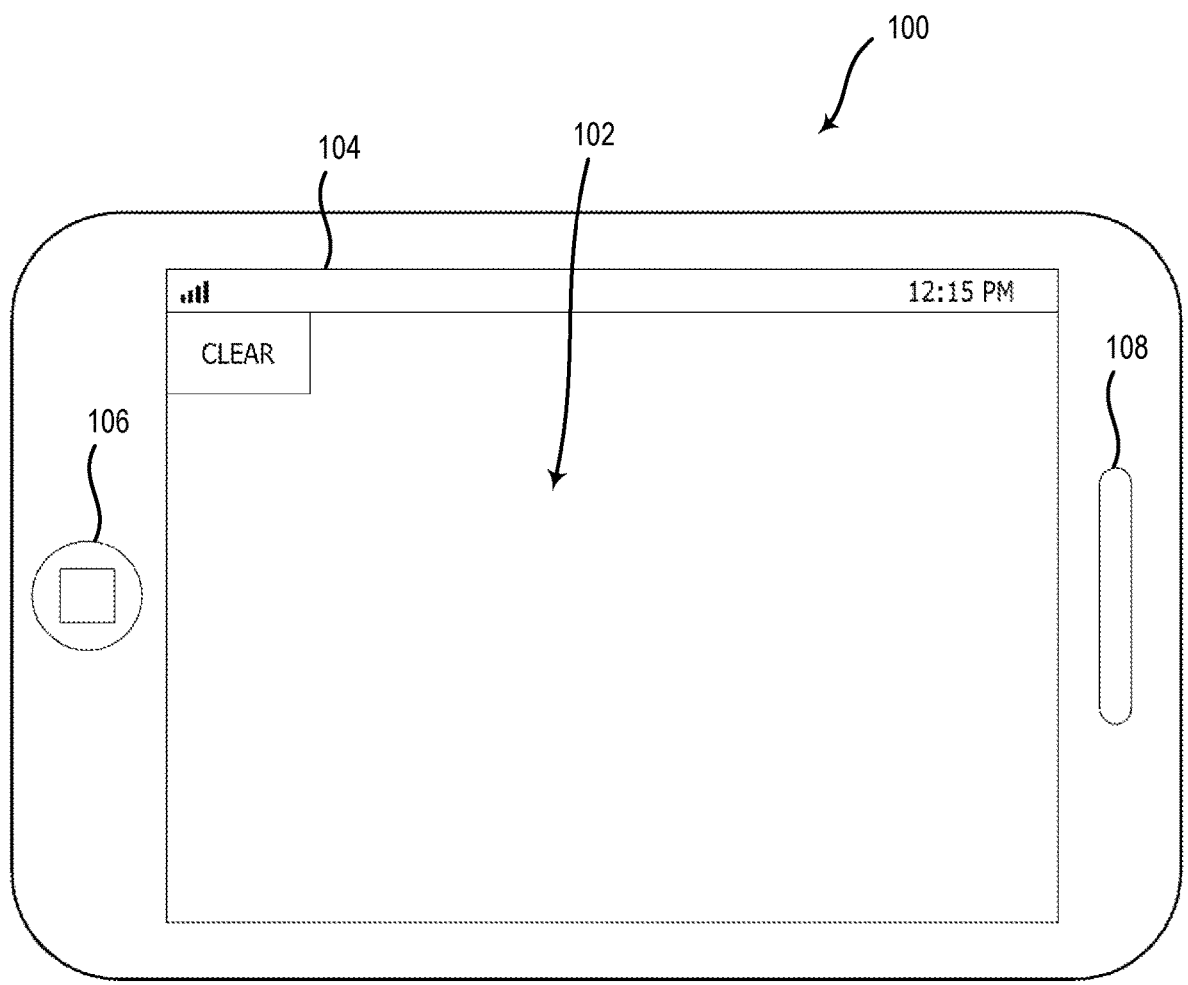
FIG. 1 is a diagram of an electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In a first aspect, a method is provided. The method includes receiving, from an input device, a plurality of touch events. Each touch event occurs at a respective time and at a respective location with respect to the other touch events of the plurality of touch events. The method additionally includes, in response to receiving a predetermined number of touch events, determining a largest time difference between the respective times of two consecutive touch events from the predetermined number of touch events. The method further includes, based on the largest time difference, determining a first touch event set and a second touch event set. The first touch event set includes at least one touch event from the predetermined number of touch events. The method also includes determining an action based at least on the respective locations of the first touch event set and the second touch event set.

In a second aspect, a system is provided. The system includes an input device configured to detect a plurality of touch events. Each touch event occurs at a respective time and at a respective location with respect to the other touch events of the plurality of touch events. The system also includes a controller, which includes a memory and a processor. The controller is configured to execute instructions stored in the memory. The instructions include, in response to receiving a predetermined number of touch events, determining a largest time difference between the respective times of two consecutive touch events from the predetermined number of touch events. The instructions also include, based on the largest time difference, determining a first touch event set and a second touch event set. The first touch event set includes at least one touch event from the predetermined number of touch events. The instructions additionally include determining an action based at least on the respective locations of the first touch event set and the second touch event set.

In an example embodiment, a predetermined number of touch events may be grouped into combinations of touch events based at least on the relative locations and relative times of each touch event. For example, touch events may be grouped together based on a largest time difference between consecutive touch events; i.e., the touch events occurring before the largest time difference may be grouped together in a first touch event set and the touch events occurring after the largest time difference may be grouped together in a second touch event set. The largest time difference between consecutive touch events may be the largest amount of time between consecutively-detected touch events, or a time span between touch events that occur one after another. In other words, the largest time difference may include the largest time "gap" between any two consecutive touch events within a set of touch events that make up the predetermined number of touch events.

Based at least on the first touch event set, an action may be determined. That is, based on the relative locations of each touch event of the first touch event set, the first touch event set may be disambiguated from other touch interactions and an associated action may be selected from a broader set of possible actions.

An example method may include receiving, from an input device, a plurality of touch events. The touch events may each occur at a relative time and location with respect to the other touch events. In response to receiving a predetermined number of touch events (e.g. five, one for each finger of one hand), the method may determine a largest time difference based on the relative times of two consecutive touch events from the predetermined number of touch events. Based on the largest time difference, a first touch event set and a second touch event set may be determined. The method further includes determining an action based at least on the relative locations of the first touch event set and the second touch event set.

It should be noted that the first touch event set and the second touch event set may be complements of one another. That is, if the predetermined number of touch events is five (corresponding to each finger of a hand), the first touch event set may include one touch event (e.g. second finger) and the second touch event set may include touch events corresponding to the remaining fingers of the hand. This complementary touch event relationship may help reduce errors in determining actions to be performed by the computing device via the input device.

While example embodiments include a touch-sensitive surface, other input devices are possible. For example, input devices configured to determine a movement and location of a finger (but not necessarily the actual finger making such a movement) are contemplated herein. For example, a camera and/or a photodetector may be configured to detect the plurality of touch events.

In some embodiments, feedback may be provided to a user in response to receiving a touch event via the input device. For example, a location corresponding to the touch event along the touch-sensitive surface may be highlighted or otherwise illuminated.

Furthermore, feedback may be provided to a user upon determining a given action from the first touch event set. For example, a display may provide information indicative of the action, e.g. display the text "TASK ACCEPTED" or "TASK COMPLETED". Other types of feedback are contemplated. As an example, audio or haptic feedback may be provided so as to confirm an action has been determined. In some embodiments, the specific information or feedback provided may vary based at least on the particular action determined.

Actions may include any number of tasks, functions, algorithms, or programs that may be carried out by a computing device. For example, actions may include at least one of: ACCEPT, REJECT, CHANNEL DOWN, CHANNEL UP, VOLUME UP, VOLUME DOWN, or TASK COMPLETED. In another example embodiment, the action may include unlocking a computing device. Other types of actions are contemplated herein.

Accordingly, the disclosure may provide systems and methods for disambiguating touch inputs via a touch-sensitive surface. In some embodiments, the systems and methods may augment, complement, and/or supplement other disambiguation methods. For example, some touch-sensitive surfaces have the ability to sense a user's fingerprints. However, dust, dirt, oil, poor finger contact and other factors may contribute to less than perfect disambiguation performance.

The current disclosure may augment such fingerprint methods in the case where some fingerprints of the fingers are not sufficiently detected so as to completely disambiguate the finger involved in the touch event. In such a scenario, the methods and techniques disclosed herein may provide better disambiguation than fingerprint methods used alone.

FIG. 1 is a diagram of an electronic device 100 in accordance with some embodiments. The electronic device 100 may be a smartphone, tablet, laptop, radio, or another type of computing and/or communications device. Electronic device 100 includes a touch-sensitive surface 102, which may also provide a visual display 104. For example, the touch-sensitive surface 102 may include a layer of an electronic visual touch screen. Alternatively, the touch-sensitive surface 102 may be incorporated directly into the visual display 104. In such scenarios, the touch-sensitive surface 102 may be operable as a user interface element of the electronic device 100. Furthermore, the visual display 104 may provide information indicative of input received via the touch-sensitive surface 102.

The touch-sensitive surface 102 is configured to sense touch events or interactions. For example, the touch-sensitive surface 102 may be operable to sense a plurality of touch events, which may include physical contact from at least some of a user's fingers and/or one or more implements such as a stylus. Additionally or alternatively, the touch events may include swipe gestures, taps, variable pressure touch, etc. It will be appreciated that other types of touch interactions or touch events are within the scope of the present disclosure.

In an example embodiment, the touch-sensitive surface 102 may include a plurality of capacitive touch sensors. In such a scenario, the touch-sensitive surface 102 may include a layer of electrically-conductive transparent material, such as indium tin oxide (ITO). A voltage may be applied to the conductive material. In such a scenario, a touch event may be sensed based on a change in capacitance when a finger is proximate to the conductive material. A position of the touch event along the touch-sensitive surface 102 may be determined based on capacitance measurements from different positions along the touch-sensitive surface 102 (e.g. from each of the four corners of the touch-sensitive surface 102).

Additionally or alternatively, the touch-sensitive surface 102 may include a pixel grid (e.g. X-Y grid). The pixel grid may include one or more layers of conductive material arranged in a two-dimensional array of rows and columns. In such a scenario, the touch-sensitive surface 102 may sense touch events via a projected capacitive touch (PCT) method. The PCT method may include sensing the touch events based on mutual capacitance sensors and/or self-capacitance sensors.

Other types of touch-sensitive surfaces are within the scope of the present disclosure. For example, resistive, piezoelectric, optical, surface acoustic wave (SAW), and thermal touch-sensitive surfaces are contemplated herein. In general, this disclosure contemplates the use of any system and/or input device configured to sense a plurality of touch events.

The electronic device 100 may include other user interface elements, such as one or more buttons 106, one or more speakers 108, and/or one or more microphones (not illustrated). The electronic device 100 may also be configured to provide haptic feedback. In some embodiments, the touch-sensitive surface 102 may be associated with and/or be proximate to such user interface elements. In an example embodiment, the electronic device 100 may provide an audio prompt via speaker 108 for a user to provide input via touch-sensitive surface 102. In another example embodiment, the electronic device 100 may provide haptic feedback in response to one or more touch events received via the touch-sensitive surface 102. Other types of prompts, instructions, feedback, and/or responsive output are within the scope of the present disclosure with respect to touch interactions with the touch-sensitive surface 102.

Additionally or alternatively, the touch-sensitive surface 102 need not be associated with and/or be proximate to a visual display or user interface elements described above. In such a scenario, the touch-sensitive surface 102 may include a non-visual touch pad that may be communicatively coupled to a computer and/or a controller.

The electronic device 100 may include a controller, which may include one or more processors and/or memory elements (not illustrated). The controller may receive input from one or more of the user interface elements described above, including the touch-sensitive surface 102. Furthermore, the controller may take various actions based on the received inputs from the user interface elements, as described herein.

Figure 2A:
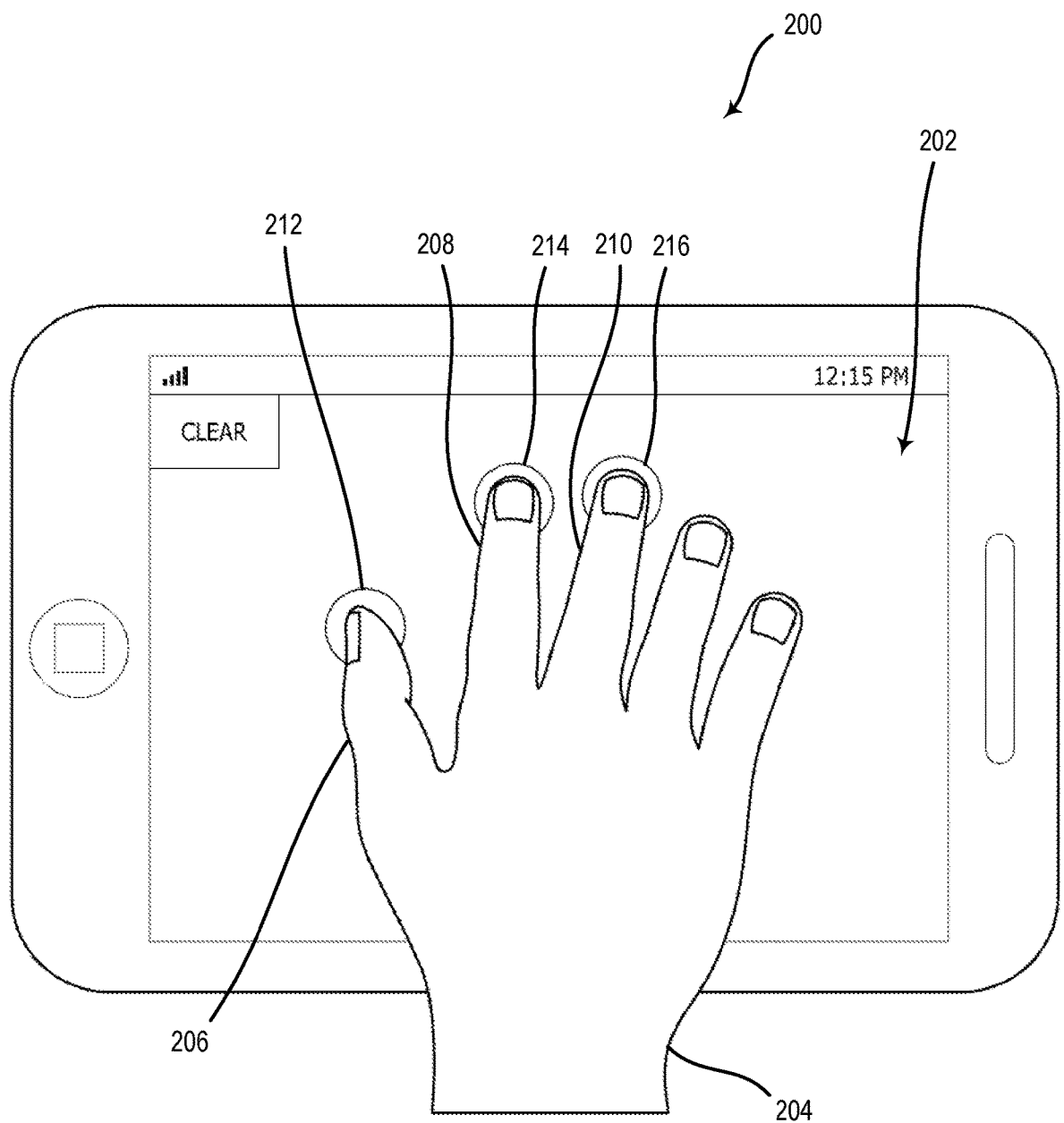
FIG. 2A is a diagram of a touch interaction scenario in accordance with some embodiments.

FIG. 2A is a diagram of a touch interaction scenario 200 in accordance with some embodiments. The touch interaction scenario 200 may include an interaction between a touch-sensitive surface 202 and a plurality of fingers of a user's hand 204. The touch-sensitive surface 202 may be similar or identical to the touch-sensitive surface 102 as illustrated and described in reference to FIG. 1. Furthermore, the touch-sensitive surface 202 may be incorporated into and/or associated with the electronic device 100 as illustrated and described in reference to FIG. 1.

Touch interaction scenario 200 includes a user's thumb 206, second finger 208, and third finger 210 coming into proximity to the touch-sensitive surface 202. In some embodiments, the user's thumb 206, second finger 208, and third finger 210 may physically touch the touch-sensitive surface 202. Alternatively, the user's fingers need not physically touch the touch-sensitive surface 202, but merely come close enough to sense a predetermined change in capacitance or other physical property.

As described above, the touch-sensitive surface 202 may be configured to recognize and/or detect the presence of the user's thumb 206, second finger 208, and third finger 210 as touch events 212, 214, and 216, respectively. Each of the touch events 212, 214, and 216 may occur at a respective time and at a respective location with respect to one another. That is, the touch events 212, 214, and 216 may occur nearly simultaneously (based on human perception); however the controller, in conjunction with the touch-sensitive surface 202, may time stamp each touch event with millisecond (ms) or better time resolution. For example, in an example embodiment touch event 212 (thumb) may occur at time 0, touch event 214 (second finger) may occur at time 7 ms, and touch event 216 (third finger) may occur at time 10 ms.

Figure 2B:
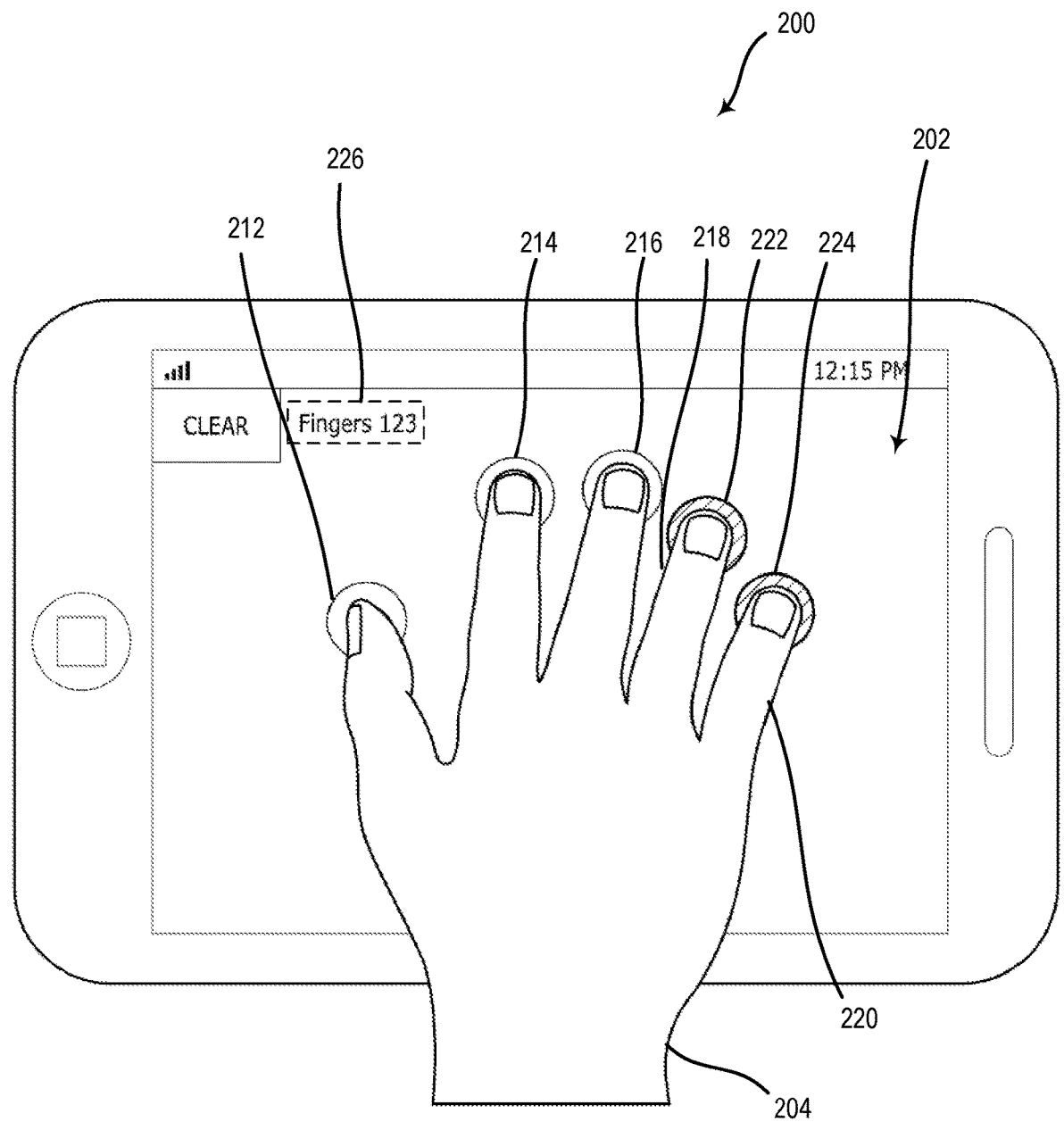
FIG. 2B is a diagram of a touch interaction scenario in accordance with some embodiments.

FIG. 2B is a diagram of a touch interaction scenario 200 in accordance with some embodiments. FIG. 2B may be a further interaction or a continuation of the touch interaction scenario 200 illustrated in FIG. 2A. The touch interaction scenario 200 may include subsequent finger interactions with the user's fourth finger 218 and fifth finger 220. That is, the user's fourth finger 218 and fifth finger 220 may physically touch or come into close proximity to the touch sensitive surface 202. In such a scenario, the touch sensitive surface 202 may sense touch events 222 (fourth finger) and 224 (fifth finger). The touch events 222 and 224 may be associated with a time stamp when received. For example, touch event 222 (fourth finger) may occur at time 62 ms and touch event 224 (fifth finger) may occur at time 72 ms, both times with respect to initial touch event 212 (thumb).

The touch interaction scenario 200 may include a predetermined number of touch events being five. That is, a method and/or system may expect a touch event associated with each finger of a user's hand before proceeding with further actions and/or method steps. Additionally or alternatively, the predetermined number of touch events may be less or greater than five. For example, the predetermined number of touch events could be any number from three to ten (to account for touch events from both hands of a user) or more.

In some embodiments, the touch events may be based on a stylus, pen, writing element, or another type of mechanical touch device. Furthermore, while examples herein disclose the predetermined number of touch events being five or ten, which may correspond to a number of fingers, the predetermined number of touch events may be any number. In other words, the touch events should not be limited to finger-only interactions.

Furthermore, the predetermined number of touch events may be independently associated with multiple touch-sensitive surfaces. For example, the predetermined number of touch events for a first touch-sensitive surface (e.g. left hand touch pad) may be five and the predetermined number of touch events for a second touch-sensitive surface (e.g. right hand touch pad) may also be five. Other predetermined numbers of touch events are within the scope of the present disclosure.

In the scenario where the predetermined number of touch events is five, sensing five touch events (e.g. one from each finger of a user's hand) may responsively trigger a determination of a largest time difference between two consecutive touch events among the set of five touch events. In the touch interaction scenario 200, the largest time difference between two consecutive touch events may be determined based on a comparison of the time stamps associated with each of the touch events 212, 214, 216, 222, and 224. In such a scenario, the time difference between touch event 216 and touch event 222 may be determined to be 52 ms, which is the largest time difference (i.e., time gap) between any two consecutive touch events.

Accordingly, the touch events occurring before the largest time difference (or time gap) may be determined to be a first touch event set. As such, touch events 212, 214, and 216 may be associated with the first touch event set as they all occurred before the time gap.

Furthermore, the touch events occurring after the time gap may be determined to be a second touch event set. Accordingly, touch events 222 and 224 may be associated with the second touch event set because they occurred after the time gap.

Additionally, a finger identifier may be assigned to each touch event based at least on the respective location of the touch event. For example, touch event 212 may be associated with finger 1 (thumb) based on the relative location of the touch event being the furthest left along an x-axis (e.g. a long axis of the touch-sensitive surface 202). Similarly, the touch events 214, 216, 222, and 224 may be associated with finger 2 (index), 3 (middle), 4 (ring), and 5 (little). Other finger identifier assignment methods are within the scope of the present disclosure. For example, at least some of the finger identifiers may be determined based on fingerprints of the respective fingers. Additionally or alternatively, the finger identifiers may be determined based on other biometric information about a user (e.g. finger length, size, spacing, etc.).

In touch interaction scenario 200, the first touch event set may include finger identifiers {1, 2, and 3} and the second touch event set may include finger identifiers {4 and 5}.

Based on the first and/or second touch event set including a given finger identifier or combination of finger identifiers, an action may be determined. For example, if the first touch event set includes {1, 2, and 3}, the action may include increasing a volume setting.

The actions may include a variety of functions executable by the controller and/or other elements of the electronic device. For example, the actions may include adjusting a channel of a communication device or application (e.g. previous channel, channel up or down, etc.). The action may also include accepting a task, rejecting a task, acknowledging receipt of a message, or providing a task completed notification. The action may additionally include adjusting a setting of the electronic device (e.g. volume up or down, display brightness/contrast up or down). The actions may include any number or variety of functions that may be conducted via the controller of the electronic device so as to adjust, change, modify, initiate, or stop an aspect of the electronic device or a device communicatively coupled to the electronic device.

In some embodiments, various visual, audio, and/or haptic feedback may be provided to the user to indicate a determined touch event set and/or the associated action. For example, touch interaction scenario 200 includes a visual notification 226 that states "Fingers 123", which may provide the user with visual confirmation of the determined first touch event set, e.g. {1, 2, and 3}. Alternatively or additionally, in response to determining the touch event set, haptic feedback may be provided to the user via the electronic device. For example, upon determining an action that acknowledges a task has been completed, a vibration may be provided to a user of the electronic device.

Figure 2C:
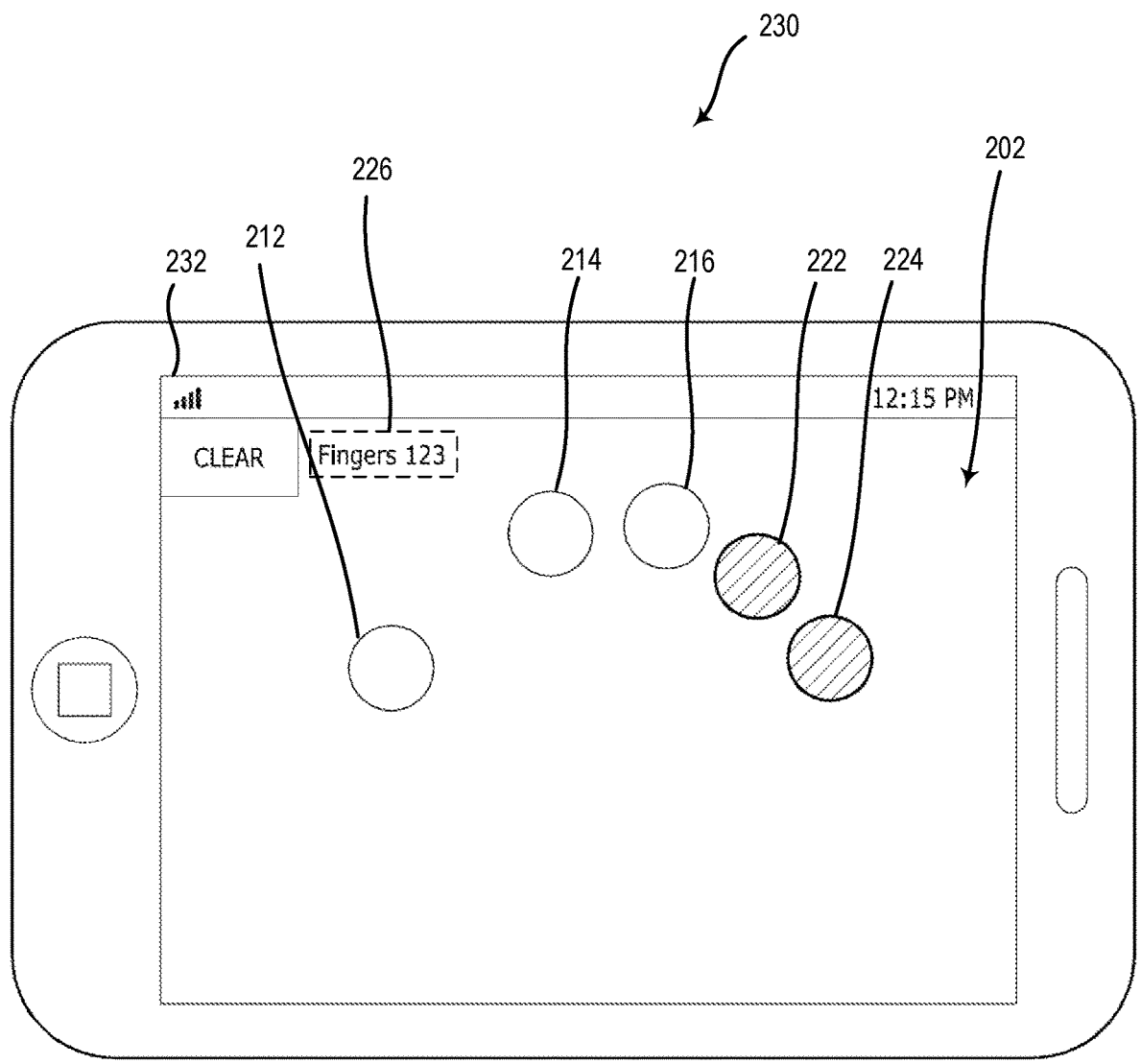
FIG. 2C is a diagram of a touch interaction result in accordance with some embodiments.

FIG. 2C is a diagram of a touch interaction result 230 in accordance with some embodiments. FIG. 2C may be a further interaction or a continuation of the touch interaction scenario 200 illustrated in FIG. 2A and/or FIG. 2B. The touch interaction result 230 may include one or more visual indications that are provided via a display 232 of the electronic device. The visual indications may relate to the touch events and/or first or second touch event sets as sensed via the touch-sensitive surface 202. For example, touch events 212, 214, 216, 222, and 224 may be displayed as circles via the display 232. The circles may be shaded based on the determined touch event set. For instance, circles representing touch events 212, 214, and 216 may be unshaded. Circles representing touch events 222 and 224 may be cross-hatched or colored. Additionally or alternatively, the visual indications may include other shapes, colors, borders, symbols, or other types of indicia. Other visual, audio, or haptic feedback is within the scope of the present disclosure to provide information indicative of the determined touch event set and/or plurality of touch events.

Figure 3A:
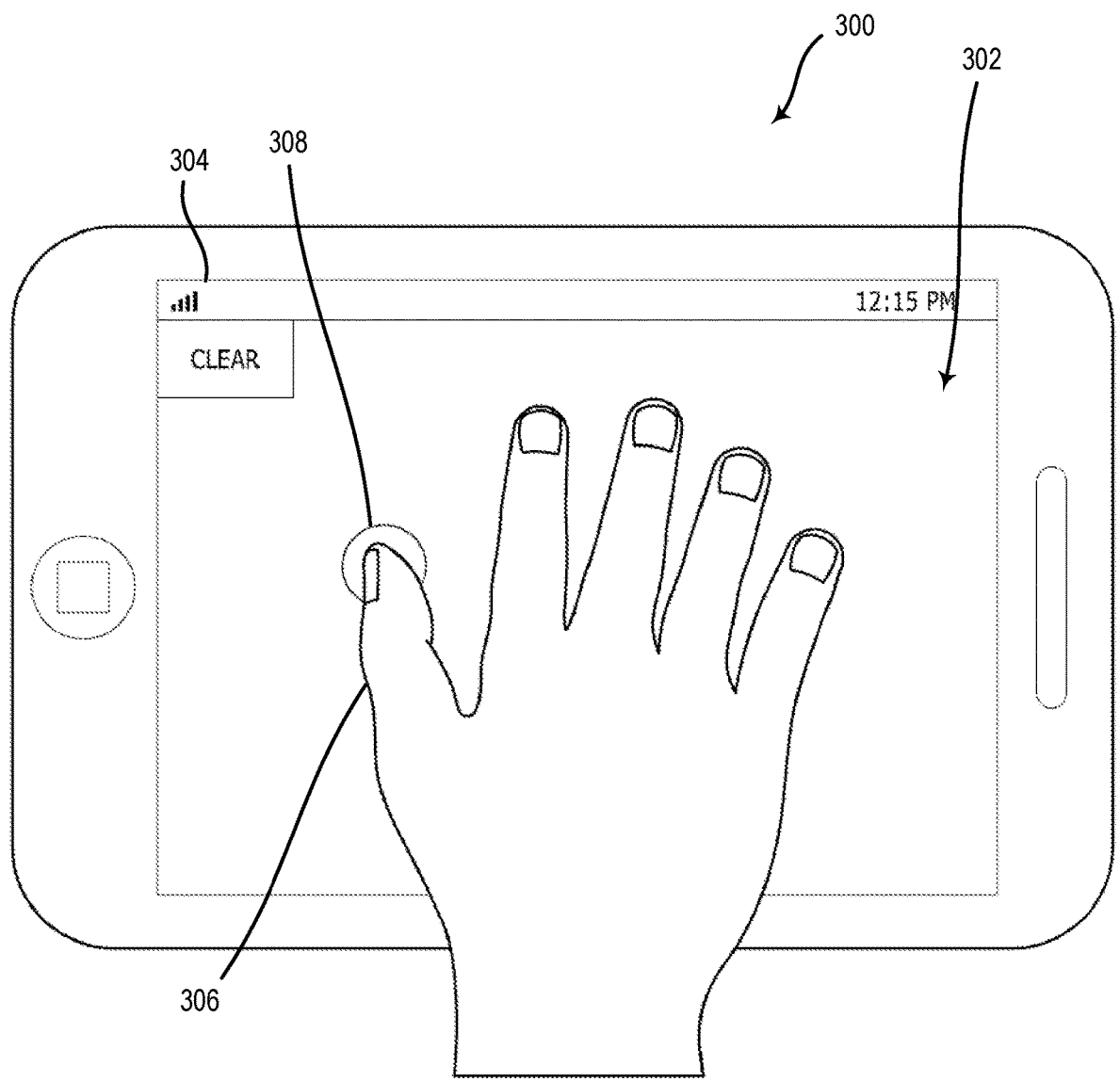
FIG. 3A is a diagram of a touch interaction scenario in accordance with some embodiments.

FIG. 3A is a diagram of a touch interaction scenario 300 in accordance with some embodiments. Touch interaction scenario 300 may include an electronic device with a touch-sensitive surface 302 and a display 304. The electronic device and its elements may be similar or identical to those described in reference to FIGS. 1 and 2A-2C.

Touch interaction scenario 300 may include a user's thumb 306 coming into physical contact and/or proximity to the touch-sensitive surface 302. Such an interaction may represent a touch event 308. Touch event 308 may be associated with a particular time (e.g. t=0 ms) and a position (e.g. x and y coordinate of the touch-sensitive surface 302 and/or the display 304).

Figure 3B:
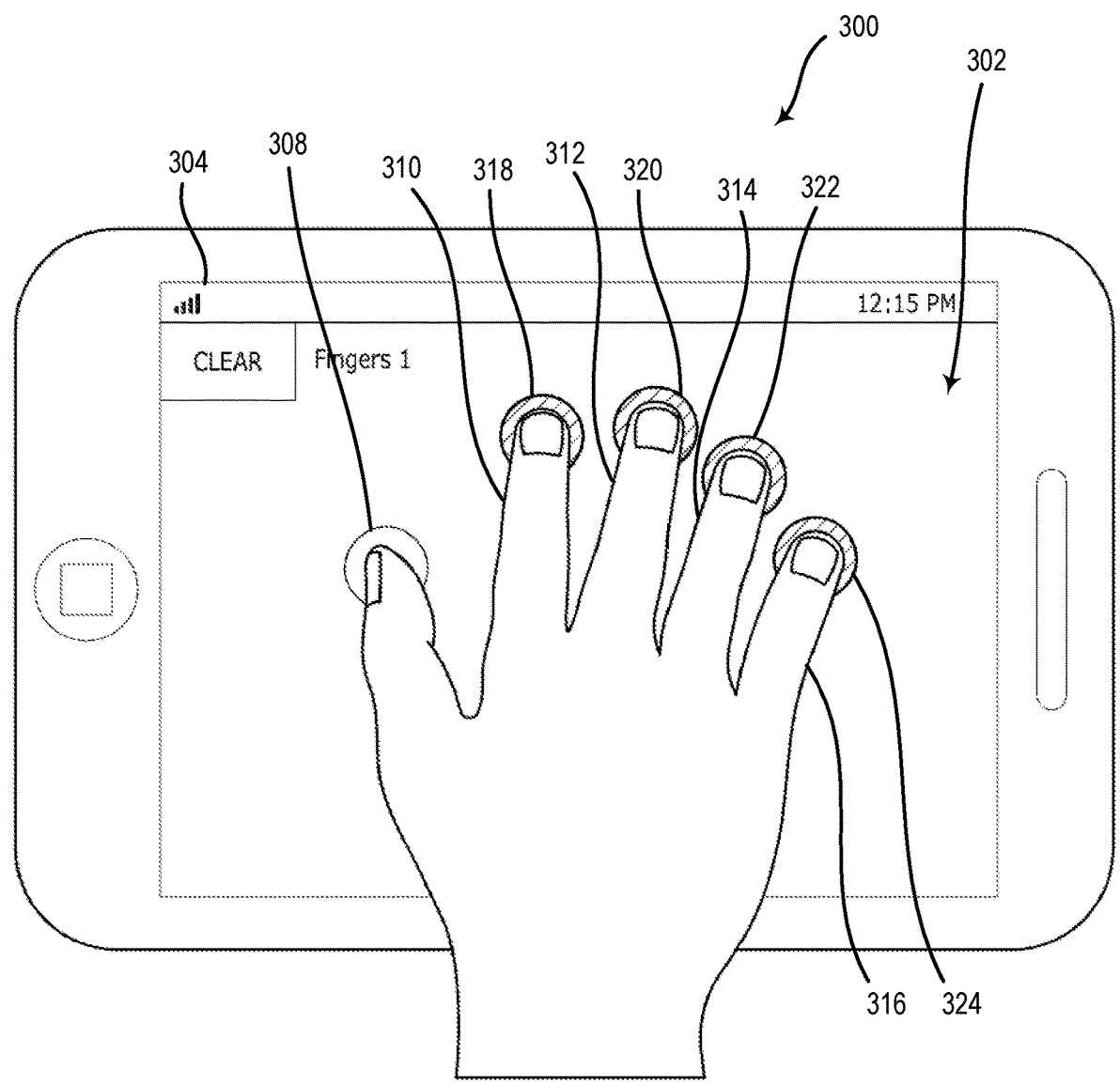
FIG. 3B is a diagram of a touch interaction scenario in accordance with some embodiments.

FIG. 3B is a diagram of a touch interaction scenario 300 in accordance with some embodiments. FIG. 3B may be a further interaction or a continuation of the touch interaction scenario 300 illustrated in FIG. 3A. Subsequent to touch event 308, the touch interaction scenario 300 may include the second finger 310, third finger 312, fourth finger 314, and fifth finger 316 coming into physical contact and/or proximity to the touch-sensitive surface 302. In such a scenario, the physical contact or proximity may be sensed as touch events 318, 320, 322, and 324. The respective touch events may be associated with a time stamp when sensed. For example, touch event 318 (second finger) may have a time stamp of 65 ms. Touch event 320 (third finger) may have a time stamp of 68 ms. Touch event 322 (fourth finger) may have a time stamp of 68 ms and touch event 324 (fifth finger) may have a time stamp of 72 ms.

As described above, the predetermined number of touch events may be five. In such a case, sensing touch events 308, 318, 320, 322, and 324 may trigger a determination of the largest time difference between respective time stamps of two consecutive touch events. For example, the largest time difference may be determined to be 65 ms, which may represent the time difference between touch event 308 and touch event 318.

Based on the determined largest time difference or time gap, the touch events may be split into a first touch event set and a second touch event set. In this scenario, the first touch event set may include touch event 308 because only touch event 308 occurred before the time gap. The second touch event set may include touch events 318, 320, 322, and 324 because those touch events occurred after the time gap.

The touch events may be further associated with a finger identifier from one to five based at least on a respective location of the touch event. Thus, touch event 308 may be associated with finger 1 (thumb), touch event 318 may be associated with finger 2 (second finger), and so on.

Accordingly, the first touch event set may include {1} and the second touch event set may include {2, 3, 4, and 5}. An action may be determined based on the first touch event set being {1}. For example, the action associated with the first touch event set being {1} may be CHANNEL UP. As such, the controller of the electronic device may cause the channel setting to increment by one. Other actions are within the scope of the present disclosure.

Figure 3C:
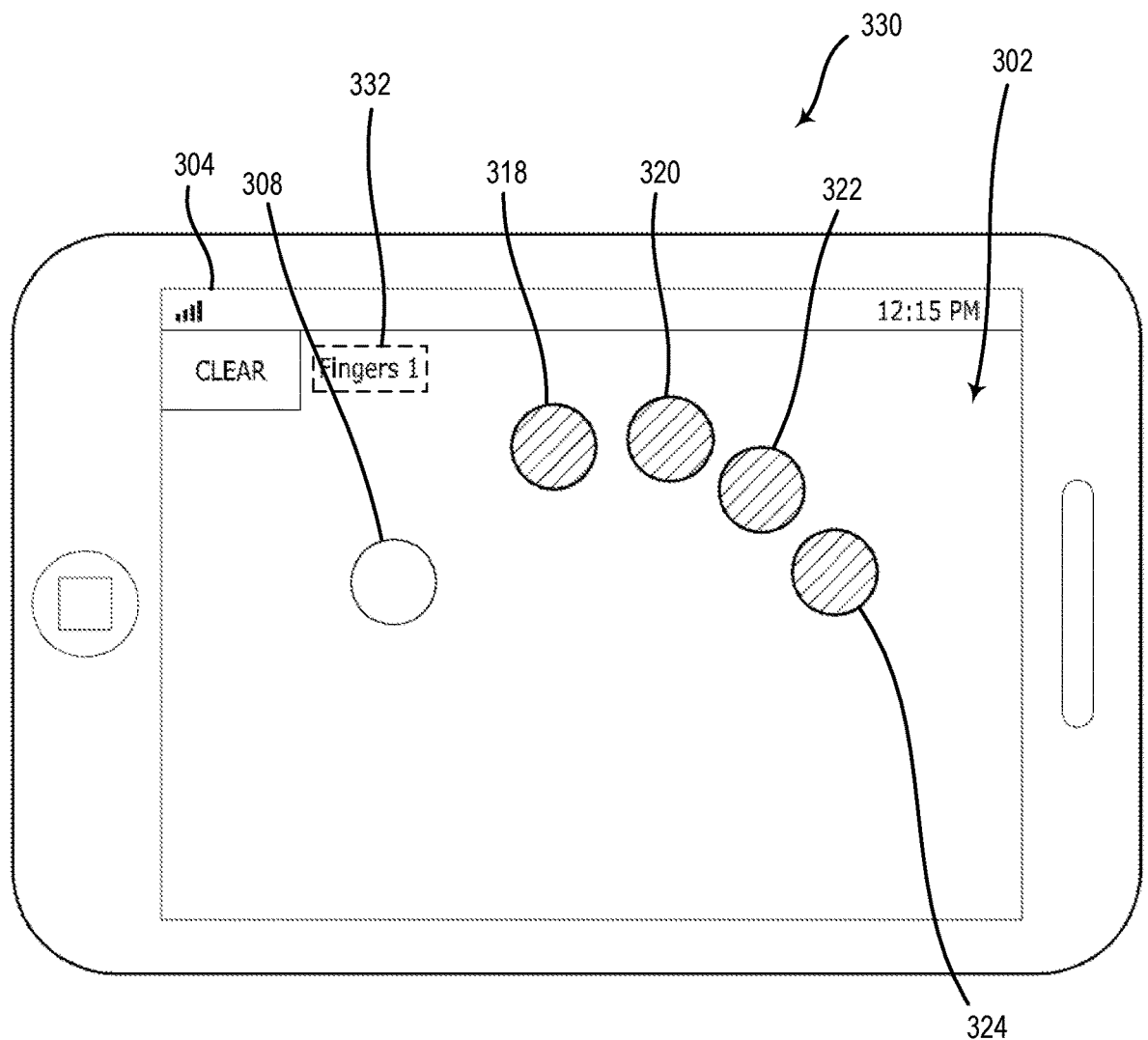
FIG. 3C is a diagram of a touch interaction result in accordance with some embodiments.

FIG. 3C is a diagram of a touch interaction result 330 in accordance with some embodiments. FIG. 3C may be a further interaction or a continuation of the touch interaction scenario 300 illustrated in FIG. 3A and FIG. 3B. The touch interaction result 330 may include one or more visual indications that are provided via a display 332 of the electronic device. The visual indications may relate to the touch events and/or first or second touch event sets as sensed via the touch-sensitive surface 302. For example, touch events 308, 318, 320, 322, and 324 may be displayed as circles via the display 304. The circles may be shaded based, on the determined touch event set. For instance, the circle representing touch event 308 may be unshaded. Circles representing touch events 318, 320, 322, and 224 may be cross-hatched or colored. Additionally or alternatively, the visual indications may include other shapes, colors, borders, symbols, or other types of indicia.

Figure 4A:
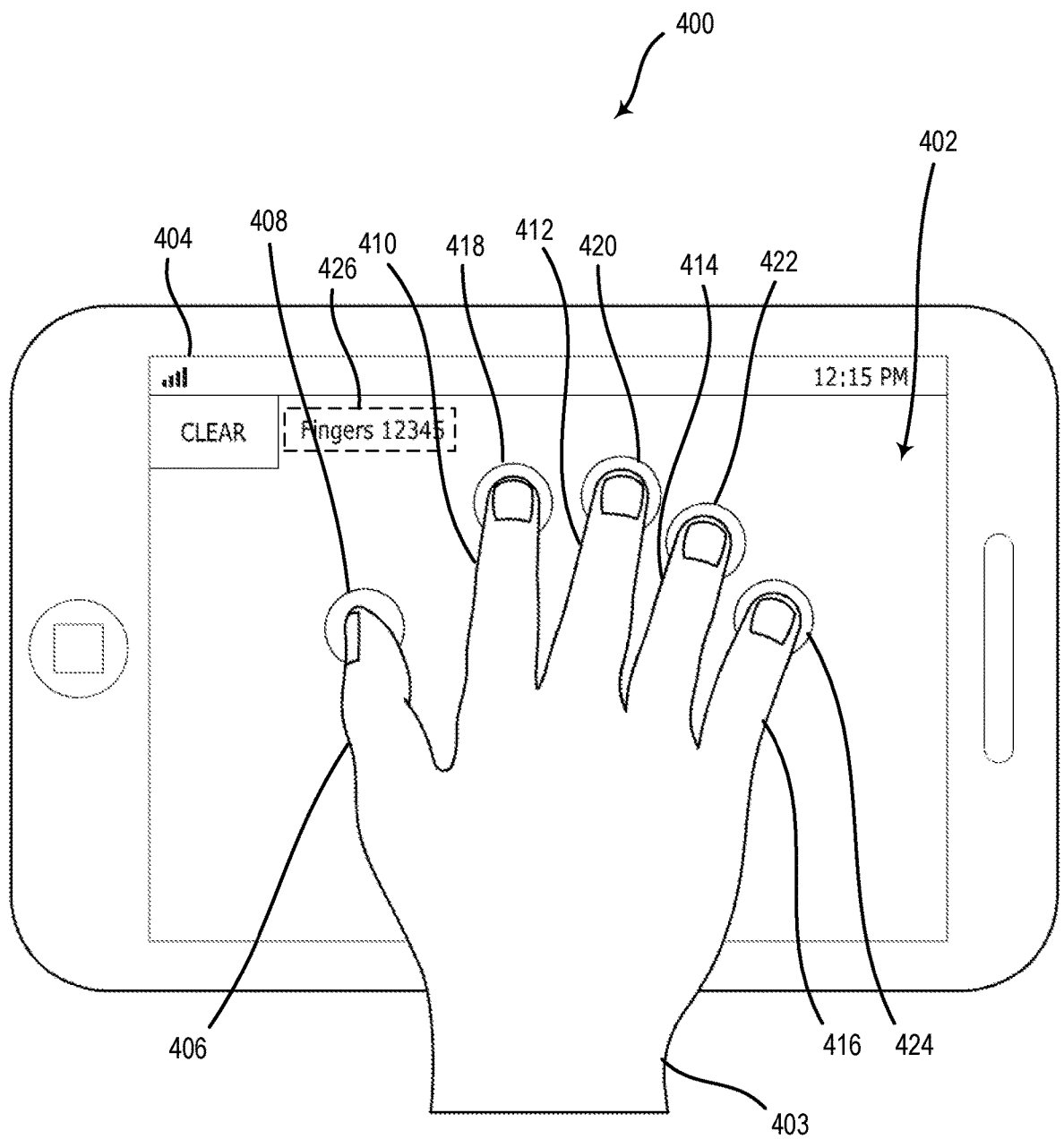
FIG. 4A is a diagram of a touch interaction scenario in accordance with some embodiments.

FIG. 4A is a diagram of a touch interaction scenario 400 in accordance with some embodiments. Touch interaction scenario 400 includes a user's hand 403 interacting with touch-sensitive surface 402. Namely, all five fingers of the user's hand (fingers 406, 410, 412, 414, and 416) may be touching or in close proximity to the touch-sensitive surface 402 at nearly the same time so as to be sensed as touch events 408, 418, 420, 422, and 424. In some embodiments, if all of the touch events 408, 418, 420, 422, and 424 occurred within a predetermined threshold time, a largest time difference determination need not be performed. In an example embodiment, if the predetermined number of touch events all occur within the predetermined threshold time (e.g. 50 ms), all of the predetermined number of touch events will be determined to be in the first touch event set. In such a scenario, the display 404 of the electronic device may provide an indication that all five fingers have been determined to be in the first touch event set (e.g. "Fingers 12345"). Other types of indications or notifications are within the scope of the present disclosure.

Figure 4B:
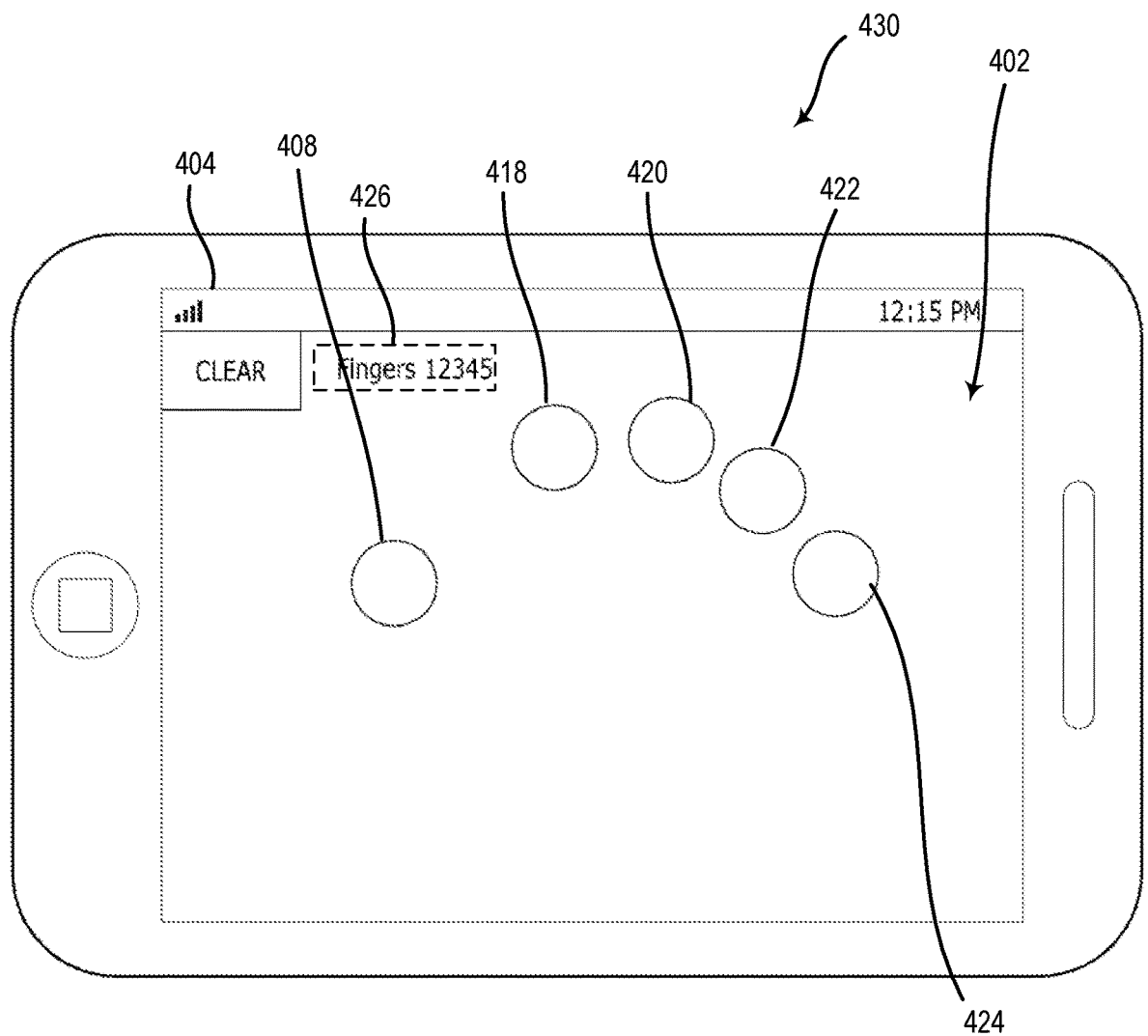
FIG. 4B is a diagram of a touch interaction result in accordance with some embodiments.

FIG. 4B is a diagram of a touch interaction result 430 in accordance with some embodiments. FIG. 4B may be a further interaction or a continuation of the touch interaction scenario 400 illustrated in FIG. 4A. As described above, the display 404 of the electronic device may be configured to provide visual indications of the detected touch events. For example, the visual indications may include circles at or near the positions at which the respective fingers contacted the touch-sensitive surface. Furthermore, the visual indications may include circles with colored or uncolored fill or shading. Additionally or alternatively, the visual indications may include other shapes, colors, borders, symbols, or other types of indicia.

Figure 5:
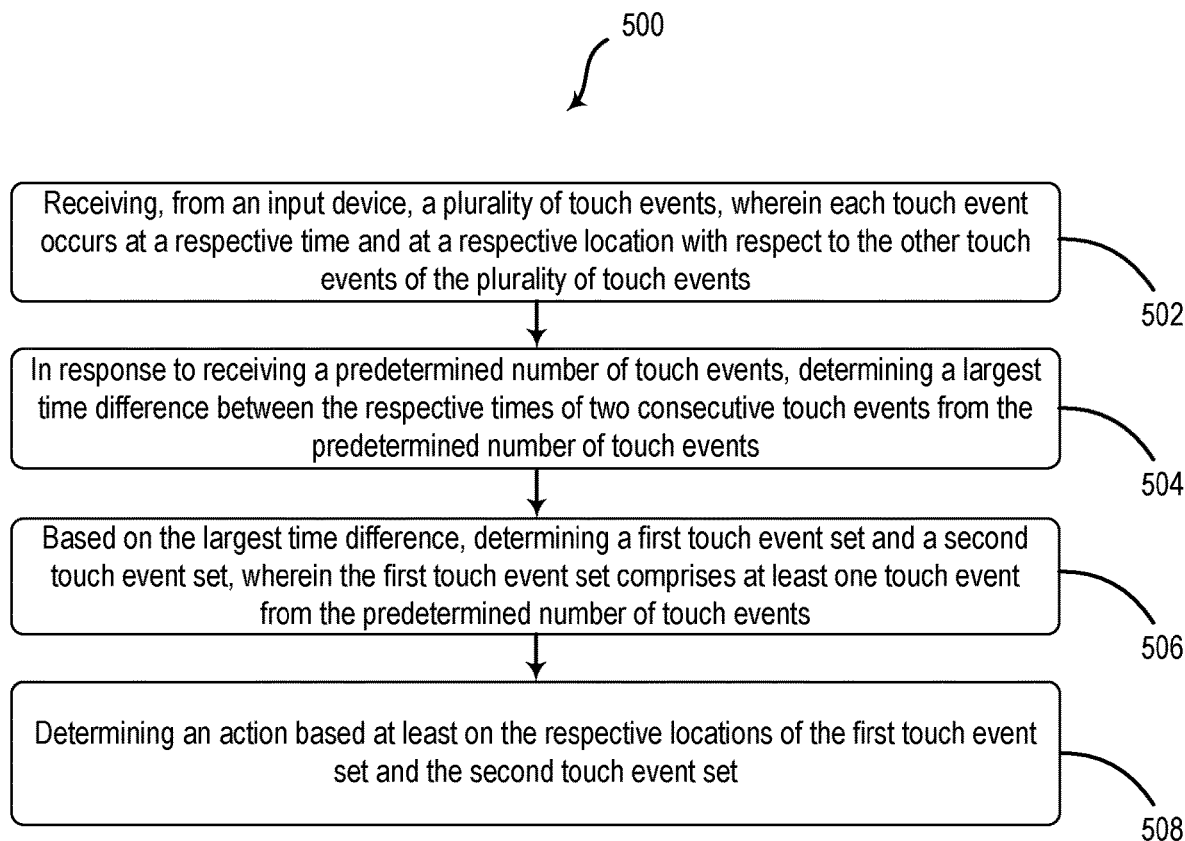
FIG. 5 is a flowchart illustrating a method in accordance with some embodiments.

FIG. 5 is a flowchart illustrating a method 500 in accordance with some embodiments. Method 500 may be carried out using various steps or blocks. The various steps or blocks may be performed in any order or combination. Furthermore, steps or blocks may be added or subtracted to method 500 according to the scope of the present disclosure. The method 500 may be carried out by the devices and systems described herein. For example, the method 500 may be carried out, at least in part, by electronic device 100 and touch-sensitive surface 102 as illustrated and described with respect to FIG. 1.

Block 502 includes receiving, from an input device, a plurality of touch events. Each touch event occurs at a respective time and at a respective location with respect to the other touch events of the plurality of touch events. The input device may be a touch-sensitive surface such as a touch pad or touch screen. For example, the input device may include a substantially flat, contiguous touch-sensitive surface. The input device may be one or more capacitive touch sensors configured to detect the plurality of touch events.

Block 504 includes, in response to receiving a predetermined number of touch events, determining a largest time difference between the respective times of two consecutive touch events from the predetermined number of touch events. In an example embodiment, the predetermined number of touch events is five. However, other predetermined numbers of touch events are within the scope of the present disclosure. Each touch event from the predetermined number of touch events corresponds to a respective finger of a hand interacting with the input device. Furthermore, in response to receiving each touch event, a display may provide visual information indicative of a respective touch event. For example, the information may include at least the respective location of the respective touch event.

Block 506 includes, based on the largest time difference, determining a first touch event set and a second touch event set. The first touch event set includes at least one touch event from the predetermined number of touch events.

Block 508 includes determining an action based at least on the respective locations of the first touch event set and the second touch event set. In some embodiments, after determining the action, information indicative of the action (e.g. an icon, words, or symbols) may be displayed via the display. Alternatively or additionally, audio or haptic information indicative of the action may be provided. A variety of different actions are within the context of this disclosure. For example, the actions may include, but are not limited to: ACCEPT, REJECT, CHANNEL DOWN, CHANNEL UP, VOLUME UP, VOLUME DOWN, or TASK COMPLETED. Other actions are within the scope of the present disclosure.

In an example embodiment, the action may include an unlock action. The unlock action may unlock at least a portion of a user interface of a computing device.

Figure 6:
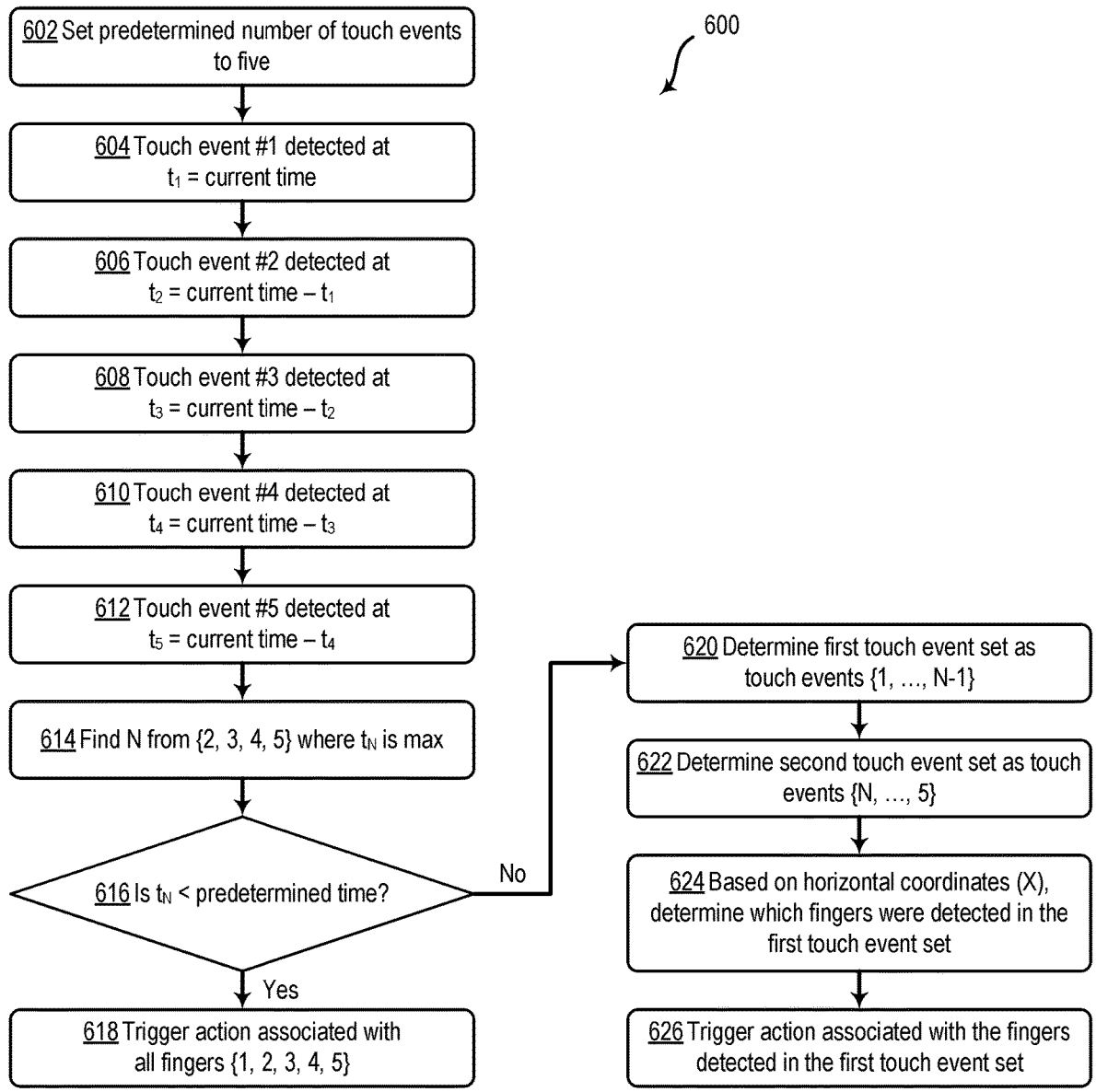
FIG. 6 is a flowchart illustrating a method in accordance with some embodiments.

FIG. 6 is a flowchart illustrating a method 600 in accordance with some embodiments. The method 600 may include setting a predetermined number of touch events to five (Block 602). The method 600 further includes detecting a plurality of touch events (604, 606, 608, 610, and 612) until the predetermined number of touch events is reached.

When the predetermined number of touch events have been received/detected, a comparison of the time differences between touch events may be performed. In such a scenario, the largest time difference between two consecutive touch events is determined (Block 614).

In an example embodiment, method 600 may include determining whether the largest time difference between two consecutive touch events is greater than a predetermined time (Block 616). For instance, the method 600 may include determining whether the largest time difference is less than 50 ms, or another period of time. In response to determining the predetermined time, the method 600 may include triggering an action associated with all five fingers.

Alternatively, if the maximum time difference is not less than 50 ms, a first touch event set may be determined based on touch events occurring before the largest time difference (time gap) (Block 620). Optionally, a second touch event set may be determined based on the touch events occurring after the largest time difference (Block 622).

The user's fingers involved in the touch events from the first touch event set may be determined based on an X-axis position along the electronic device and the touch-sensitive surface. Based on the finger identifiers, an action may be triggered. The action may be carried out, at least in part, via the electronic device.

The methods 500 and 600 as illustrated and described in reference to FIGS. 5 and 6, respectively, may be carried out, at least in part, by instructions stored in a non-transitory computer readable medium. Such instructions may be stored in a memory and executed by a computer processor.

In the foregoing specification, specific embodiments have been described. However, one of ordinary skill in the art appreciates that various modifications and changes can be made without departing from the scope of the invention as set forth in the claims below. Accordingly, the specification and figures are to be regarded as illustrative rather than restrictive, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having", "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, from an input device, at least three touch events, wherein each touch event occurs at a respective time and at a respective location with respect to the other touch events of the at least three touch events;
   determining whether a count of the at least three touch events equals a predetermined number;
   when the count of the at least three touch events equals the predetermined number, comparing time differences between each consecutively received touch events in the at least three touch events to determine at least two time differences between the consecutively received touch events;
   determining a largest time difference of the at least two time differences;
   determining whether the largest time difference is greater than a predetermined number;
   in response to determining that the largest time difference is greater than the predetermined time, identifying a first touch event set including touch events occurring before the largest time difference from the at least three touch events and a second touch event set including touch events occurring after the largest time difference from the at least three events; and
   determining an action based at least on the respective locations of the first touch event set and the second touch event set.

2. The method of claim 1, wherein determining an action comprises:
   assigning an identifier corresponding to each touch event in the first touch event set and the second touch event set based at least on the respective locations of each of the touch events in the first touch event set and second touch event set; and
   determining an action based on a combination of identifiers assigned to the touch events in at least one of the first touch event and second touch event.

3. The method of claim 1, wherein the predetermined number of touch events is five and wherein each touch event from the predetermined number of touch events corresponds to a respective finger of a hand interacting with the input device.

4. The method of claim 1, wherein the input device comprises a substantially flat, contiguous touch-sensitive surface, and wherein the input device comprises at least one of: a touch pad or a touch screen, and further wherein each touch event from the predetermined number of touch events corresponds to a respective finger of a hand that has been detected as physically touching or coming into close proximity to the touch-sensitive surface.

5. The method of claim 1, wherein the input device comprises at least one capacitive touch sensor and wherein the at least one capacitive touch sensor is configured to detect the at least three touch events.

6. The method of claim 1, further comprising, in response to receiving each touch event, displaying, via a display, information indicative of a respective touch event, wherein the information comprises at least the respective location of the respective touch event.

7. The method of claim 1, further comprising, in response to determining the action, displaying, via a display, information indicative of the action.

8. The method of claim 1, further comprising, in response to determining the action, providing at least one of: audio information indicative of the action or haptic information indicative of the action.

9. The method of claim 1, wherein the action comprises at least one of: ACCEPT, REJECT, CHANNEL DOWN, CHANNEL UP, VOLUME UP, VOLUME DOWN, or TASK COMPLETED.

10. The method of claim 1, wherein the action comprises an unlock action, and wherein the unlock action further comprises unlocking a user interface of a computing device.

11. A system comprising:
an input device configured to detect at least three touch events, wherein each touch event occurs at a respective time and at a respective location with respect to the other touch events of the at least three touch events; and
a controller comprising a memory and a processor, wherein the controller is configured to execute instructions stored in the memory, the instructions comprising:
determining whether a count of the at least three touch events equals a predetermined number;
when the count of the at least three touch events equals the predetermined number of touch events, comparing at least two time differences between each consecutively received touch events in the at least three touch events to determine a largest time difference between the respective time differences of two consecutively received touch events from the at least three touch events;
determining whether the largest time difference is greater than a predetermined time;
in response to determining that the largest time difference is greater than the predetermined time, identifying a first touch event set including touch events occurring before the largest time difference from the at least three touch events and a second touch event set including touch events occurring after the largest time difference from the at least three events; and
determining an action based at least on the respective locations of the first touch event set and the second touch event set.

12. The system of claim 11, wherein the instructions further comprises:
assigning an identifier corresponding to each touch event in the first touch event set and the second touch event set based at least on the respective locations of each of the touch events in the first touch event set and second touch event set; and
determining an action based on a combination of identifiers assigned to the touch events in at least one of the first touch event and second touch event.

13. The system of claim 11, wherein the predetermined number of touch events is five and wherein each touch event from the predetermined number of touch events corresponds to a respective finger of a hand interacting with the input device.

14. The system of claim 11, wherein the input device comprises a substantially flat, contiguous touch-sensitive surface, and wherein the input device comprises at least one of: a touch pad or a touch screen, and further wherein each touch event from the predetermined number of touch events corresponds to a respective finger of a hand that has been detected as physically touching or coming into close proximity to the touch-sensitive surface.

15. The system of claim 11, wherein the input device comprises at least one capacitive touch sensor and wherein the at least one capacitive touch sensor is configured to detect the at least three touch events.

16. The system of claim 11, wherein the instructions further comprise, in response to receiving each touch event, causing a display to display information indicative of the respective touch event, wherein the information comprises at least the respective location of the respective touch event.

17. The system of claim 11, wherein the instructions further comprise, in response to determining the action, causing a display to display information indicative of the action.

18. The system of claim 11, wherein the instructions further comprise, in response to determining the action, providing at least one of: audio information indicative of the action or haptic information indicative of the action.

19. The system of claim 11, wherein the action comprises at least one of:
ACCEPT, REJECT, CHANNEL DOWN, CHANNEL UP, VOLUME UP, VOLUME DOWN, or TASK COMPLETED.

20. The system of claim 11, wherein the action comprises an unlock action, and wherein the unlock action comprises unlocking a user interface of a computing device.

* * * * *